June 7, 1960 P. F. J. LAMAUDIERE 2,939,926
SWITCHES
Filed July 1, 1957 2 Sheets-Sheet 1
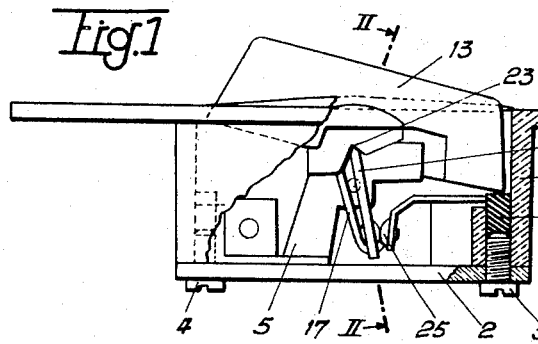
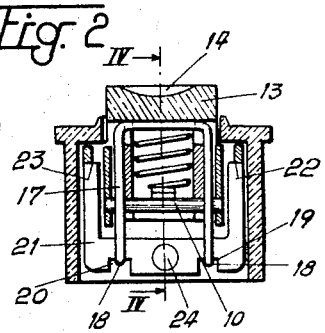
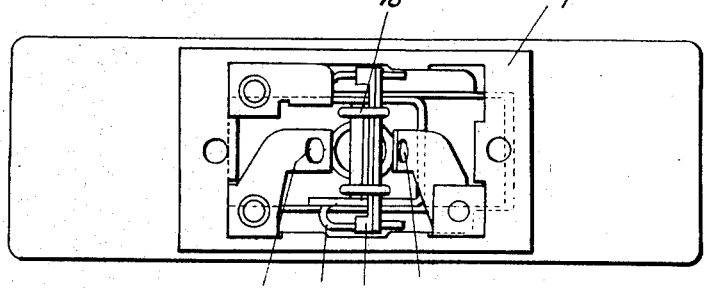
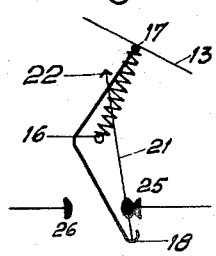
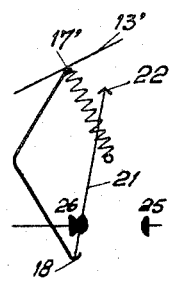
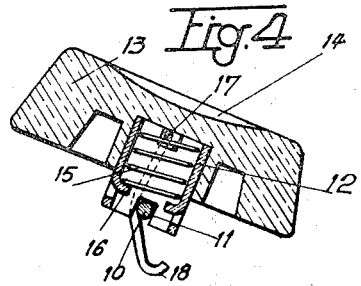
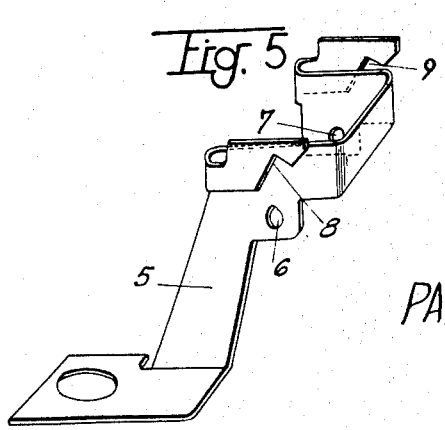
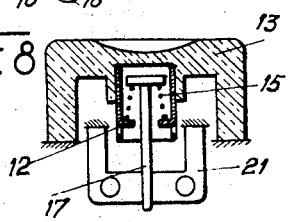
INVENTOR
PAUL FRANÇOIS JOSEPH LAMAUDIERE
By *Linton and Linton*
ATTORNEYS June 7, 1960 P. F. J. LAMAUDIERE 2,939,926
SWITCHES
Filed July 1, 1957 2 Sheets-Sheet 2
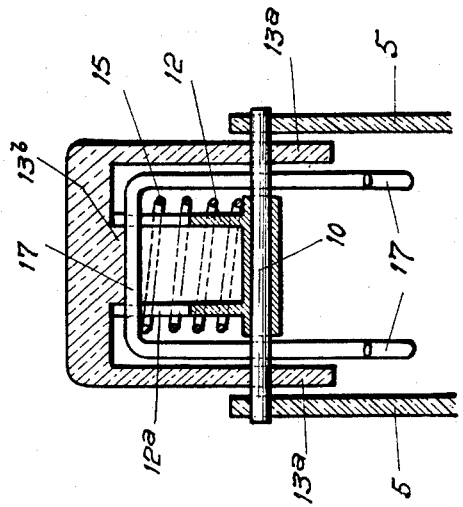
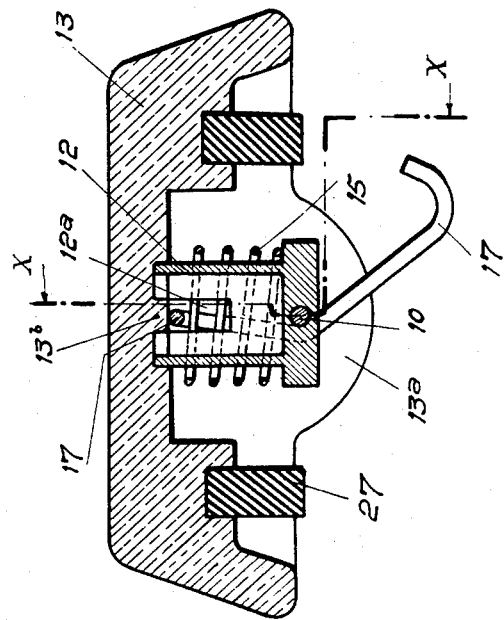
INVENTOR
PAUL FRANÇOIS JOSEPH LAMAUDIERE
By Linton and Linton
ATTORNEYS

United States Patent Office 2,939,926
Patented June 7, 1960

2,939,926

SWITCHES

Paul François Joseph Lamaudiere, 81, Boulevard Suchet, Paris, France

Filed July 1, 1957, Ser. No. 669,075

Claims priority, application France July 28, 1956

2 Claims. (Cl. 200—67)

My invention has for its object a switch including a contact-carrying rocker the movement of which is produced by a compression spring the axis of which coincides with that of the control knob or lever, said spring transmitting its action to the rocker through a link or stirrup engaging through its ends on the one hand, the rocker, and on the other hand, the spring.

Furthermore, the spring has for its action to urge constantly the rocker and the control lever or knob against the switch body so as to seat said rocker and knob on the corresponding pivotal axes.

According to a further object of my invention, said switch includes a spring bearing through one end against a point of the switch body either directly or through the agency of a member bearing in its turn against said body while its other end serves as a seat for the link or stirrup the end of which is pivotally secured to a predetermined point of the rocker which is in its turn pivotally secured to the switch body round a stationary pivotal line.

This system of movable members, to wit the control lever or knob and the rocker the angular movements of which are limited by abutments obtained in the very building of the switch is thus secured to the frame of the apparatus through the opposed action of the spring and of the stirrup.

According to a modification, the spring is provided with an inner guide and the movable system, more particularly the stirrup, is carried by the control knob.

As more particularly apparent from the following description, reference being made to the accompanying drawings, my improved switch is such that it may be housed inside a casing which houses entirely the parts which are subjected to tensioning, such as in particular the terminals which may be reached both for introducing the connecting wire and for fastening same through openings which are provided in the walls of the casing and in the bottom of the latter.

Further features of said switch will appear in the reading of the following description referring to the accompanying drawings given by way of exemplification and wherein:

Fig. 1 is a lateral elevational view of my improved switch, partly sectional.

Fig. 2 is a cross-section thereof through line II—II of Fig. 1.

Fig. 3 is a view from below said switch.

Fig. 4 is a cross-section through line IV—IV of Fig. 2.

Fig. 5 is a perspective view of the stationary member carrying the actual mechanism.

Figs. 6 and 7 are diagrammatic views illustrating the operation of the switch.

Fig. 8 is a transverse sectional view of a modification.

Fig. 9 is a longitudinal sectional vertical view of a second embodiment.

Fig. 10 is a sectional view through line X—X of Fig. 9.

The different parts of the switch illustrated in Figs. 1 to 5 are entirely enclosed inside a casing 1 inside which they are introduced through the bottom 2 which is removable and is secured in position by screws such as 3 and 4. The actual mechanism is carried by a stationary support 5 illustrated with further detail in Fig. 5 and which is provided with bearings 6 and 7 and with notches 8 and 9, the part played by which will be disclosed hereinafter.

Inside the bearings 6 and 7 in said support 5 are carried the ends of a spindle 10 over which rests a socket 12 rigid with the control knob 13, said socket bearing on the spindle through the notches 11 formed in the lower edge of the socket. As shown more particularly in Fig. 2, said knob 13 is provided outwardly with a central recess 14 adapted to be engaged by the operator's finger so that the knob may be rocked round the axis of the spindle 10.

Inside the socket 12 is fitted a spring 15 which is inserted between tongues 16 formed by a slash in the lower end of the wall of the socket 12 and a stirrup-shaped member 17—18. The stirrup is bent so that its hook-shaped ends 18 engage the notches 19 and 20 (Fig. 2) formed in the lower edge of a rocker 21 in the shape of a U, the upper ends 22—23 of which rocker engage the notches 9 and 10 respectively of the support 5.

The rocker 21 carries a contact-piece 24 adapted to engage either of the cooperating stationary contact-pieces 25 and 26 arranged symmetrically to either side of the plane of symmetry passing through the axes of the knob and of the spindle 10.

When a single stationary contact-piece such as 25 is provided, the other contact-piece 26 may be replaced by an insulating stop limiting the angular stroke of the rocker to the same value as that provided by the second contact-piece, if it were extant.

Furthermore, as illustrated in Fig. 1, there are provided for engagement by the ends of the knob 13 during its rocking movements elastic cushions, such as 27, facing the cooperating terminal sections of the control knob 13.

The operation of this arrangement is extremely simple: when the control knob is caused to rock round the spindle 10 with the stirrup 17—18, the inner section of the stirrup 17—18 moves out of its position illustrated in Fig. 6 into its position 17' (Fig. 7) on the other side of the upper edge 22—23 of the U-shaped rocker. Since the length of the stirrup 17—18 is constant, the spring begins being compressed until the point passes beyond the line 22—23, i.e. beyond the plane of the rocker 21; at this moment the spring expands again and brings suddenly the contact-piece 24 into contact with the opposite contact-piece 26 or with the stop used in lieu thereof.

The same operation is repeated in the opposite direction when the knob 13 is brought back from the position 13' illustrated in Fig. 7 into the position illustrated in Fig. 6.

As illustrated diagrammatically in Fig. 8, it is possible to obtain a similar arrangement incorporating a stirrup which is limited to a single arm arranged axially of the spring.

In the embodiment according to Figs. 9 and 10, the spindle 10 passes through the lower end of the socket 12, through the flanges 13a rigid with the control knob 13 and through openings in the support 5 which are similar to the openings 6 and 7 of the preceding embodiment. Said member 5 and the control knob 13 are thus secured together The socket 12 is provided with a diametrical slot 12a inside which may move the stirrup shaped member 17 and it is held centrally by a projection 13b on the inner surface of the knob 13, which projection engages the slot 12.

Lastly, it is advantageous to provide in this same inner surface of the knob 13 recesses for engagement by elastic cushions or stops 27.

What I claim is:

1. A switch comprising a housing having a top opening, a control member positioned in said housing opening, a tubular socket fixedly mounted at one end on and extending laterally of said control member, said socket being provided at its opposite ends with diametrically parallel passageways, a spindle fixedly mounted within said housing and extending through the socket passageway at the other end of said socket laterally of the axis of said socket pivotally supporting said control member, a U-shaped stirrup having its base portion extending through the other of said socket passageways, a coil spring positioned within said socket extending axially thereof with one end against the base portion of said stirrup, means retaining the other end of said spring within said socket, a U-shaped rocker having its base mounted on said stirrup and its leg ends pivotally mounted in said housing, contacts mounted on said rocker and further contacts mounted in said housing for engaging said rocker contacts upon the rocking of said control member.

2. A switch comprising a housing having an open top, a control member loosely positioned in said housing opening for being manually operated, a tubular socket having one end fixedly mounted on the side of said control member within said housing and extending laterally from the medial portion thereof, said socket having opposite recesses in the end on said control member, said socket having recesses in the other end diametrically opposite said first-mentioned recesses, a U-shaped stirrup member having its base portion extending through said first-mentioned socket recesses and angular hook-shaped legs, a spindle mounted within said housing and extending through the second-mentioned recesses of said socket, a coil spring mounted within and extending axially of said socket with one end against said stirrup base portion, means retaining the other end of said spring within said socket, a U-shaped rocker having its base portion mounted on the hooks of said stirrup member, means pivotally supporting the leg ends of said rocker within said housing in line with said spindle, contacts carried by said rocker base portion and further contacts mounted in said housing on opposite sides of said rocker base portion for engaging said first-mentioned contacts upon operation of said control member.

References Cited in the file of this patent

UNITED STATES PATENTS

| | | |
|---|---|---|
| 2,757,252 | Sparr | July 31, 1956 |
| 2,794,890 | Taylor | June 4, 1957 |

FOREIGN PATENTS

| | | |
|---|---|---|
| 247,201 | Great Britain | June 10, 1926 |
| 310,250 | Great Britain | Apr. 25, 1929 |
| 776,095 | France | Oct. 22, 1938 |
| 654,693 | Great Britain | June 27, 1951 |